F. A. Gleason,
Doretailing Machine,
No. 1,754, Reissued Aug. 30, 1864.
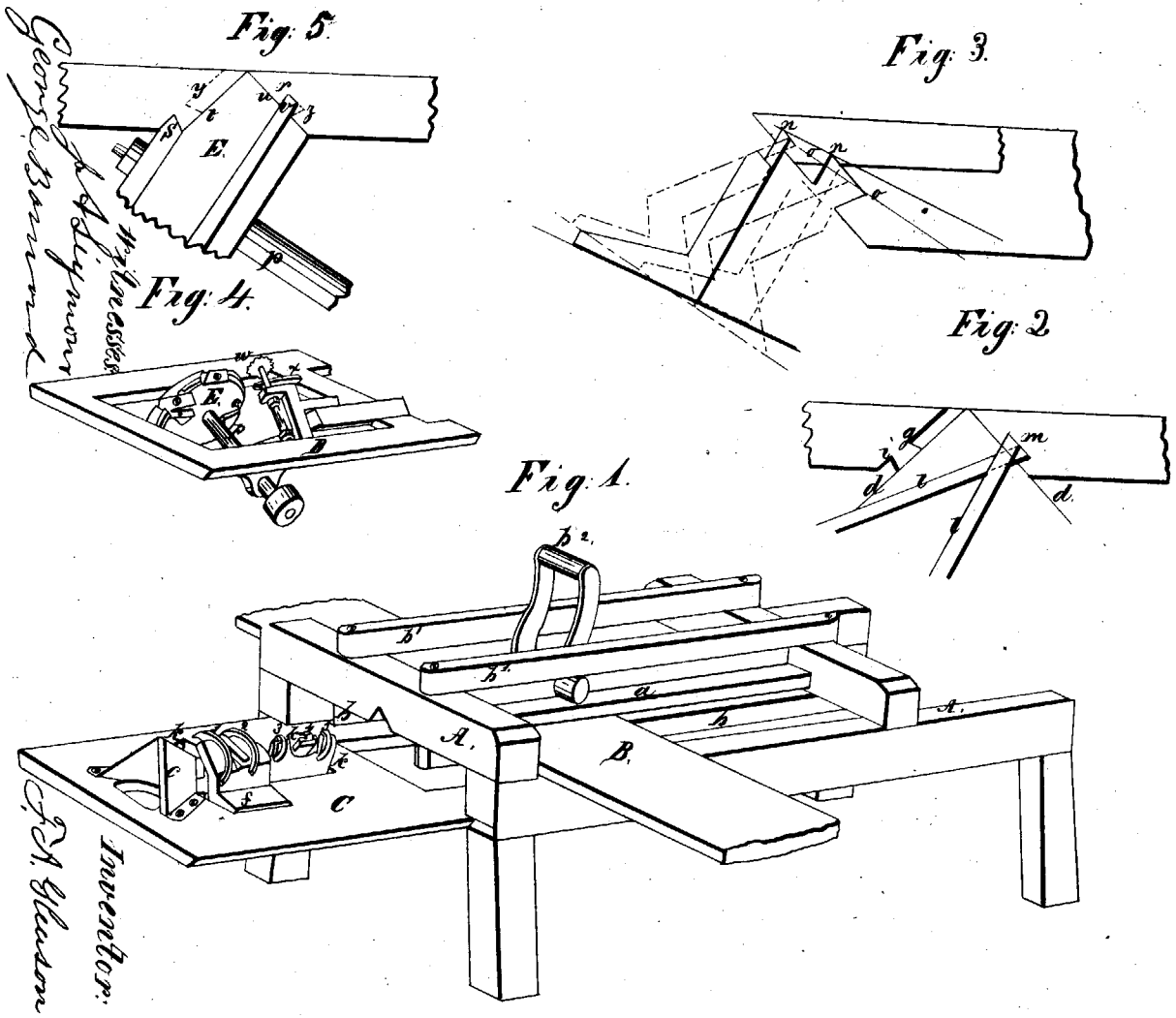
AM. PHOTO-LITHO. CO. N.Y. (OSBORNE'S PROCESS)

UNITED STATES PATENT OFFICE.

JOHN M. NICHOLS, OF BROOKLYN, NEW YORK, ASSIGNEE, BY MESNE ASSIGNMENTS, OF F. A. GLEASON.

IMPROVEMENT IN MACHINES FOR MITER-DOVETAILING.

Specification forming part of Letters Patent No. 37,910, dated March 17, 1863; Reissue No. 1,754, dated August 30, 1864.

*To all whom it may concern:*

Be it known that F. A. GLEASON, of Rome, in the county of Oneida and State of New York, did invent a new and useful Machine for Miter-Dovetailing; and the following is hereby declared to be a full, clear, and exact description of the construction and operation of the same, reference being had to the annexed drawings, making a part of this specification, wherein—

Figure 1 is a perspective view of said machine. Fig. 2 represents the lines upon which the surfaces of the miter-dovetails are formed. Fig. 3 illustrates the manner in which the cutters can be adjusted to form different sizes of dovetails, and Figs. 4 and 5 represent a variation in the manner of effecting the separation of the lumber at the same time that the dovetail is formed.

The nature of the said invention consists in forming a miter with a dovetail groove and a dovetail tongue at one operation by cutters that act with a drawing cut and form a smooth surface, thereby the separate operations heretofore employed of first cutting one miter and groove or rib and then the other are rendered unnecessary, and the smooth surfaces of the dovetail tongue and groove on the miters are formed at one operation without moving the lumber.

The invention also relates to separating the lumber by the act of forming the dovetail miters, thereby rendering separate sawing unnecessary and avoiding the time and cost of such sawing.

To enable others skilled in mechanics to make and use the invention, its construction and operation is described.

The frame A A, Fig. 1, is constructed of any convenient size, according to the work for which it is intended, and of such form that the piece of lumber B to be wrought is placed under the rail *a*, to which it is secured by the clamp, which consists of two pieces, *b b*, below the board and two, *b b*, above, connected by screws at the ends. These clamps are operated by two cams, connected by the handle $b^2$, so as to draw the board up against the under side of the rails *a*. Within the frame are ways, in which runs a reciprocating slide or carriage, C. Upon this slide I place one, or if for heavy work two or three, turtle-bill or V cutters, *c*, of such form as to cut a miter, as represented by the lines *d d*, Fig. 2. Following these is placed a cutter-stock, *f*, in which cutters 1 2 are fixed, which cut the angle *g*, Fig. 2, and near this is a V-cutter, *h*, which cuts the angle *i*, Fig. 2, forming a dovetail tongue. Following these are placed two cutter-stocks, *k k*, so arranged that their respective cutters 3, 4, and 5 cross each others' lines, as seen at *l l*, Fig. 2, which, consecutively and alternately following each other, cut the dovetail groove *m*. These cutter-stocks are all set upon inclines parallel with lines drawn across like angles at the different sizes of dovetail, parts of which are represented at *n n o o*, Fig. 3, by which means the adjustment to position and depth of cut required for different thicknesses of lumber are simultaneous. The cutters are made as an arc of a circle for compactness, that form admitting of their following each other more closely.

There may be other mechanical devices constructed by which the same result may be accomplished of dividing the board at the same time that dovetail miters are formed, and one of which is shown at Fig. 4, in which D represents a slide, which moves in the same ways as the former. In it runs an arbor or mandrel, *p*, set obliquely at right angles to a line from one side of the groove at *p*, Fig. 5. Upon this is fixed a disk, E, whose periphery is turned to the angles formed by the lines *s t u v*, and cutters fitted to each of them. Following this are two small adjustable counter-stocks, carrying arbors with small disk-cutters *w x*, or circular saws, either of which may be used, one cutting to the dotted lines *y*, the other to the dotted lines *z*, completing the work.

The reciprocating motion may be given to the slides by rack and pinion screw, or any other method in common use.

This invention is not limited to any precise form or position of parts, nor to any particular device for moving or operating them, as these may be largely varied without essential or substantial variation from the character of the invention herein set forth.

What is claimed as the invention of the said FRANKLIN A. GLEASON, and to be secured by Letters Patent, is—

1. Forming a miter with a dovetail tongue and a dovetail groove at one operation by cutters that act with a drawing cut and form a smooth surface, substantially as specified.

2. Forming at one operation a dovetail groove on one side and a dovetail tongue on the other side of a miter joint and separating crosswise a piece of lumber, substantially as specified.

3. A series of standing cutters arranged, as specified, so as to produce a proportionate increase or decrease in the size of the tongue or groove in the act of adjusting such cutters for different thicknesses of material, as specified.

4. Forming the standing cutters for dovetail miters as an arc of a circle, as specified, so that such cutters can be more compact than would be the case if straight cutters were employed, as set forth.

In witness whereof JOHN M. NICHOLS, assignee of the said F. A. GLEASON, has hereunto set his hand this 30th day of May, 1861.

J. M. NICHOLS.

Witnesses:

LEMUEL W. SERRELL,
THOS. GEO. HAROLD.